(12) United States Patent
Son et al.

(10) Patent No.: US 11,243,636 B1
(45) Date of Patent: Feb. 8, 2022

(54) ROLLABLE DISPLAY DEVICE (71) Applicant: STMicroelectronics Asia Pacific Pte Ltd., Singapore (SG)

(72) Inventors: Ju Hyun Son, Seoul (KR); Min Sang Kim, Anyang-si (KR); Yun Sang On, Yongin (KR); Sa Hyang Hong, Seoul (KR); Yong Hun Lee, Songpa-gu/Seoul (KR)

(73) Assignee: STMICROELECTRONICS ASIA PACIFIC PTE LTD., Singapore (SG)

( * ) Notice: Subject to any disclaimer, the term of this patent is extended or adjusted under 35 U.S.C. 154(b) by 0 days.

(21) Appl. No.: 17/107,137

(22) Filed: Nov. 30, 2020

(51) Int. Cl.
| | |
|---|---|
| G06F 3/045 | (2006.01) |
| G06F 3/041 | (2006.01) |
| G06F 1/16 | (2006.01) |
| G06F 3/044 | (2006.01) |

(52) U.S. Cl.
CPC ........ *G06F 3/04166* (2019.05); *G06F 1/1618* (2013.01); *G06F 3/0446* (2019.05); *G06F 2203/04102* (2013.01)

(58) Field of Classification Search
CPC .. G06F 1/1618; G06F 3/04166; G06F 3/0446; G06F 2203/04102; G09F 9/301
See application file for complete search history.

(56) References Cited

U.S. PATENT DOCUMENTS

| | | | |
|---|---|---|---|
| 6,771,232 B2 | 8/2004 | Fujieda et al. | |
| 7,639,237 B2 | 12/2009 | Perkins | |
| 9,911,369 B2 | 3/2018 | Kim et al. | |
| 10,503,307 B2 | 12/2019 | Hong et al. | |
| 10,942,602 B1* | 3/2021 | Ponnarasu | G06F 3/0446 |
| 2005/0235215 A1* | 10/2005 | Dunn | G09B 5/02 715/740 |
| 2007/0106950 A1* | 5/2007 | Hutchinson | G06F 3/0488 715/761 |
| 2010/0033435 A1 | 2/2010 | Huitema | |
| 2013/0127917 A1* | 5/2013 | Kwack | G06F 1/1652 345/660 |
| 2015/0220188 A1* | 8/2015 | Zhao | G06F 3/0416 345/174 |
| 2016/0034997 A1 | 2/2016 | Amacker | |
| 2018/0081473 A1* | 3/2018 | Seo | G06F 3/0412 |
| 2018/0217679 A1* | 8/2018 | Kwon | G06F 3/0484 |
| 2018/0374452 A1 | 12/2018 | Choi et al. | |

* cited by examiner

*Primary Examiner* — Joe H Cheng
(74) *Attorney, Agent, or Firm* — Slater Matsil, LLP (57) ABSTRACT

A method for operating an electronic device includes: having a touch sensitive display configured to be rolled into or unrolled out of a first retainment structure along a first direction. The first retainment structure includes a conductive material disposed within the first retainment structure. The method includes unrolling or rolling the touch sensitive display to an unrolled position along the first direction; determining that the touch sensitive display is detecting contact at a plurality of mutual sensing locations using a mutual sensing process; determining that the touch sensitive display is detecting contact at a plurality self-sensing locations using a self-sensing process; determining a plurality of multi-mutual sensing locations based on multi-mutual sensing values obtained from a multi-mutual sensing process; and determining the unrolled position along the first direction based on the plurality of mutual sensing locations, the plurality self-sensing locations, and the plurality of multi-mutual sensing locations.

22 Claims, 7 Drawing Sheets

ROLLABLE DISPLAY DEVICE

TECHNICAL FIELD

The present invention relates generally to a system and method that utilize touch screen technology, and, in particular, embodiments to a system and method for a rollable display device.

BACKGROUND

Electronic devices that are designed for user interaction have historically utilized external input devices such as keyboards, key pads, and/or mice to capture user input. In recent years, there has been a push from the more traditional methods, as consumers prefer the convenience of portable devices that can support a more flexible lifestyle. To this end, there has been a rise in smaller, portable, hand-held electronic devices, such as mobile phones, tablets, gaming systems, etc. This has given rise to the popularity of touch screens and touch panel displays as systems for capturing user input. Not only do they provide the functionality of the traditional electronic devices, but touchscreens provide additional features. For example, given the appropriate software, users are able to utilize touchscreens for sketching, drawing, and various hand writing applications.

Electronic devices such as mobile phones, tablets, and gaming systems include a touchscreen for displaying image information. Traditionally, touchscreens are not bendable, foldable, or rollable, and therefore, the size of the display dictates the overall size of the device. Accordingly, when a large display is adopted, the size of the electronic device increases.

With the development of flexible displays that are capable of being rolled up, the size of a display may be increased without increasing the size of the device. However rollable displays come with their own set of advantages and disadvantages. Rollable displays require additional components such as optical sensors to detect the displacement of a rollable display (i.e. the fraction of the surface of the display that is rolled or unrolled) to determine the distance to project an image which requires extra electrical components and/or layers in the rollable display and increases the power consumption of the rollable device.

SUMMARY

In accordance with an embodiment of the present invention, a method for operating an electronic device includes having a touch sensitive display with a first side of the touch sensitive display mounted in a first retainment structure that is disposed within a first housing, the touch sensitive display configured to be rolled into or unrolled out of the first retainment structure along a first direction, where the first retainment structure includes a conductive material disposed within the first retainment structure, and where the touch sensitive display includes a first plurality of capacitive electrodes arranged in rows across the touch sensitive display and a second plurality of capacitive electrodes arranged in columns across the touch sensitive display; unrolling or rolling the touch sensitive display to an unrolled position along the first direction; determining that the touch sensitive display is detecting contact at a plurality of mutual sensing locations using a mutual sensing process; determining that the touch sensitive display is detecting contact at a plurality self-sensing locations using a self-sensing process; determining a plurality of multi-mutual sensing locations based on multi-mutual sensing values obtained from a multi-mutual sensing process; and determining the unrolled position along the first direction based on the plurality of mutual sensing locations, the plurality self-sensing locations, and the plurality of multi-mutual sensing locations.

In accordance with an embodiment of the present invention, a method for operating an electronic device including: having a rollable display configured to be rolled into or unrolled out of a housing, the unrolled portion of the rollable display at an unrolled position extending away from the housing in a first direction, the housing including a conductive material configured to be capacitively sensed by a capacitive touch screen on the rollable display; and determining that the rollable display is detecting the conductive material at a location on the capacitive touch screen using a multi-mutual sensing process; and determining the unrolled position of the rollable display along the first direction based on the location on the capacitive touch screen.

In accordance with an embodiment of the present invention, an electronic device includes: a first housing; a first retainment structure disposed within the first housing; a conductive material disposed within the first retainment structure; a touch sensitive display having a first side mounted within the first retainment structure, where the touch sensitive display is configured to be rolled into or unrolled out of the first retainment structure to an unrolled position along a first direction, and where the touch sensitive display includes a first plurality of capacitive electrodes arranged in rows across the touch sensitive display and a second plurality of capacitive electrodes arranged in columns across the touch sensitive display; a processor; a memory for storing a program to be executed in the processor, the program including instructions when executed cause the processor to: determine that the touch sensitive display is detecting contact at a plurality of mutual sensing locations; determine that the touch sensitive display is detecting contact at a plurality self-sensing locations; determine that the touch sensitive display is detecting a plurality of multi-mutual sensing locations; and determine the unrolled position of the touch sensitive display based on the plurality of mutual sensing locations, the plurality self-sensing locations, and the plurality of multi-mutual sensing locations.

BRIEF DESCRIPTION OF THE DRAWINGS

For a more complete understanding of the present invention, and the advantages thereof, reference is now made to the following descriptions taken in conjunction with the accompanying drawings, in which:

FIGS. 1A-1F illustrate an electronic device having a touch sensitive display that is configured to be rolled or unrolled into a housing and determine the unrolled position of the touch sensitive display with in accordance with an embodiment of the invention, wherein

FIG. 4A illustrates a front view of the electronic device with the touch sensitive display in a fully rolled position, FIG. 4B illustrates a front view of the electronic device with the touch sensitive display in a fully unrolled position, FIG. 4C illustrates a front view of the electronic device with the touch sensitive display in a partially unrolled position.

The drawings are not necessarily drawn to scale. The drawings are merely representations, not intended to portray specific parameters of the invention. The drawings are intended to depict only specific embodiments of the inventions, and therefore should not be considered as limiting in scope. In the drawings, like numbering represents like elements.

DETAILED DESCRIPTION OF ILLUSTRATIVE EMBODIMENTS

The structure, method, and using of various embodiments of an electronic device are discussed in detail below. However, it should be valued that the various embodiments detailed herein may be applicable in a wide variety of disciplines. The specific embodiments described herein are merely illustrative of specific ways to make and use various embodiments.

While flexible displays have led to great advances in the evolution of portable electronic devices, due to their delicate nature there are still limitations that exist. Namely, flexible displays capable of being enlarged by unrolling and reduced by rolling require additional electrical components and/or additional layers to detect the unrolled display position which can lead to an increase in display thickness, an increase in power consumption, and an increase in manufacturing costs.

Conventional devices use self-sensing and mutual-sensing algorithms to determine the location of a finger, or gesture. If the only thing to be sensed is the fraction of the display that is rolled/unrolled, a combination of self-sensing and mutual-sensing algorithms can be used. However, in practice, while measuring the fraction of the display that is rolled/unrolled, the display may also be touched with a finger or may include water droplets or other materials. In such cases, conventional algorithms are unable to differentiate the fraction of the display that is rolled/unrolled with the other touch instances.

Embodiments of the present invention relate to an electronic device that can reliably detect and accurately report the unrolled position of a flexible display without adding any additional electrical components or layers to the flexible display. Various embodiments of the present application disclose a device and a method to reliably detect the unrolled position of a flexible display without adding additional electrical components or layers to the flexible display.

Figure 2:
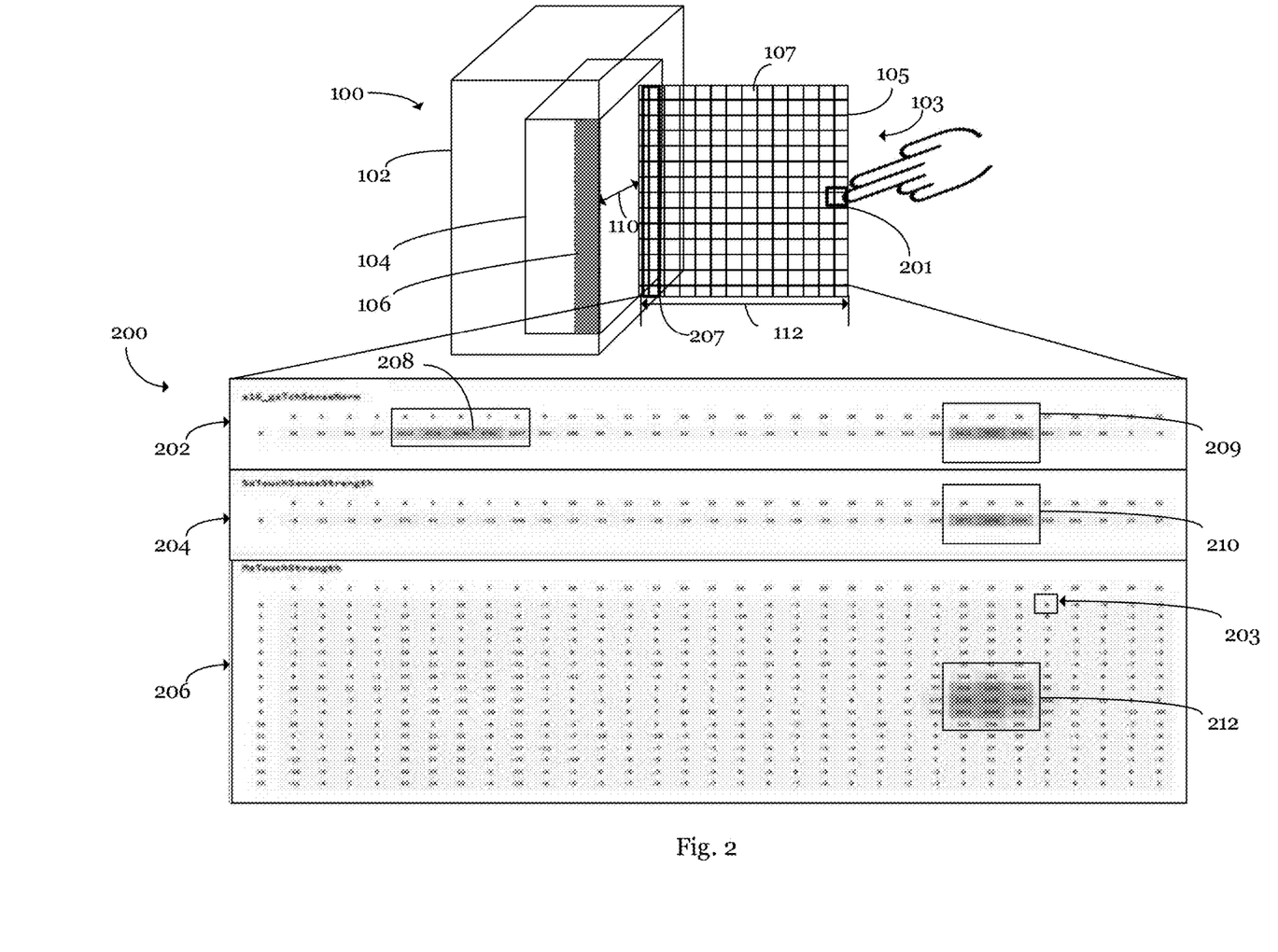
FIG. 2 illustrates exemplary raw touch data detected by an electronic device in accordance with an embodiment of the invention.
Figure 3:
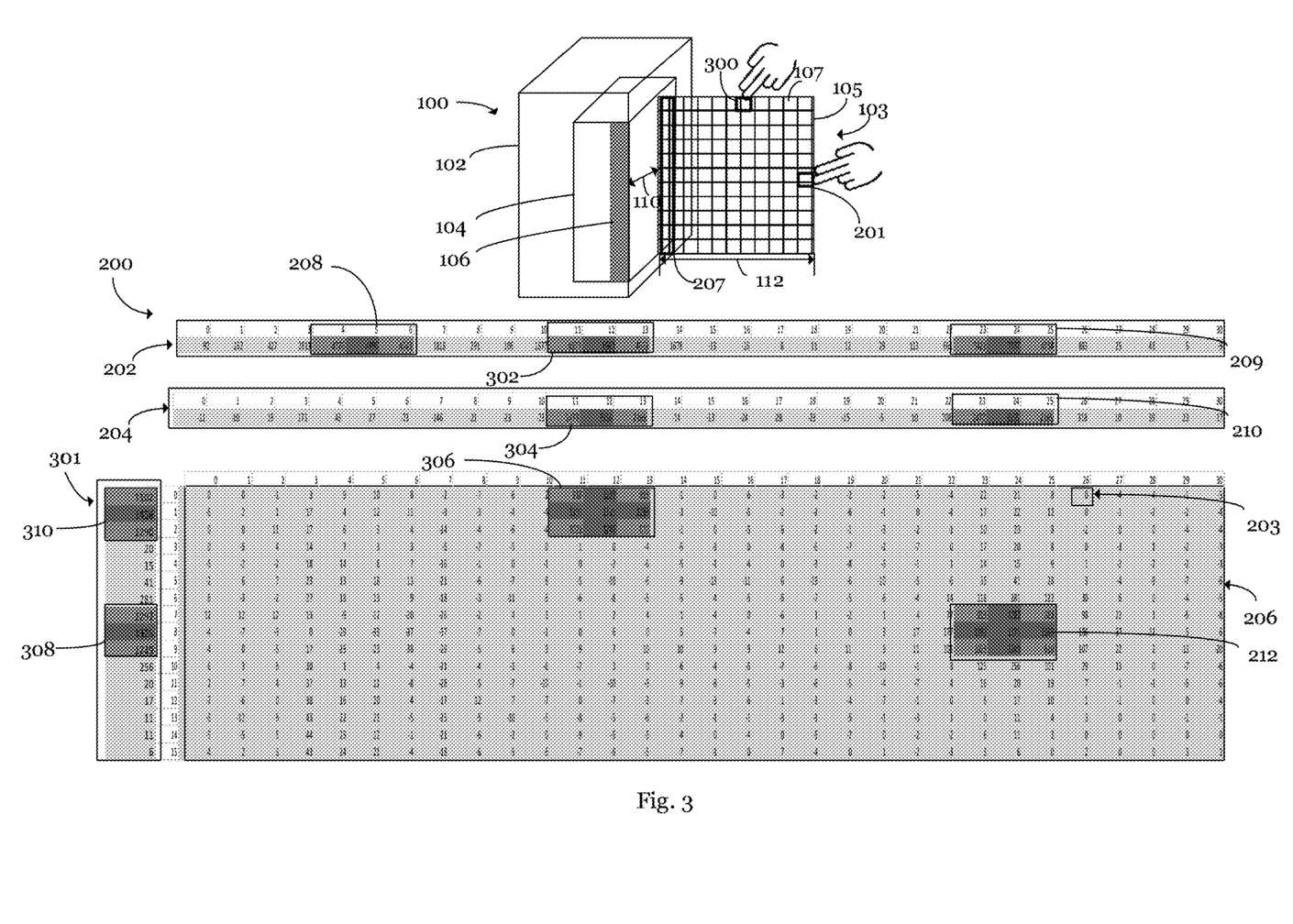
FIG. 3 illustrates exemplary raw touch data detected by an electronic device in accordance with an embodiment of the invention.
Figure 4:
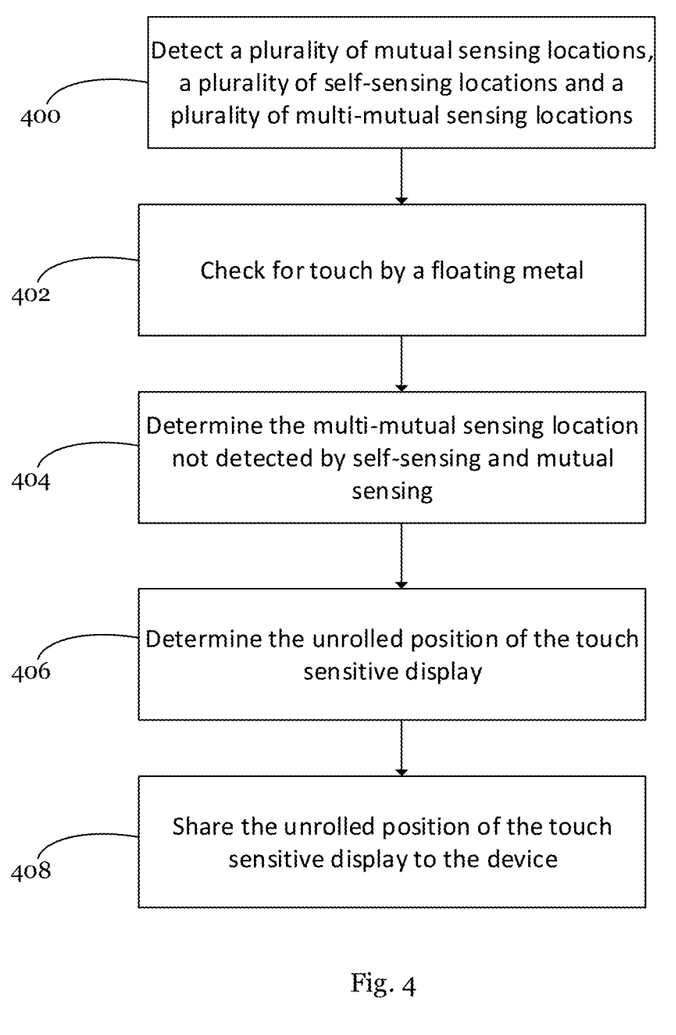
FIG. 4 illustrates a process flow, as performed at the touch detector 130 of FIG. 1E, to determine the unrolled position of the touch sensitive display based on an analysis of the mutual sensing data and self-sensing data in accordance with an embodiment of the present invention.

An electronic device with a rollable touch sensitive display for determining the unrolled position of the touch sensitive display will be described using FIGS. 1A-1F. FIG. 2 will be used to describe representative raw touch data measurements from the rollable touch sensitive display. FIG. 3 will then be used to describe a method of implementing the features of the electronic device discussed in FIGS. 1A-1F. FIG. 4 will then describe an alternative electronic device with a rollable touch sensitive display.

Figure 1A:
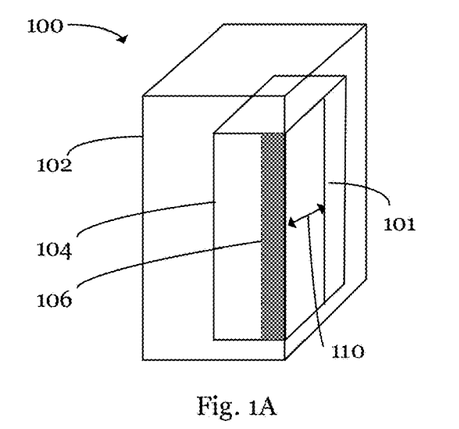
FIG. 1A illustrates a front view of the electronic device with the touch sensitive display in a fully rolled position.
Figure 1B:
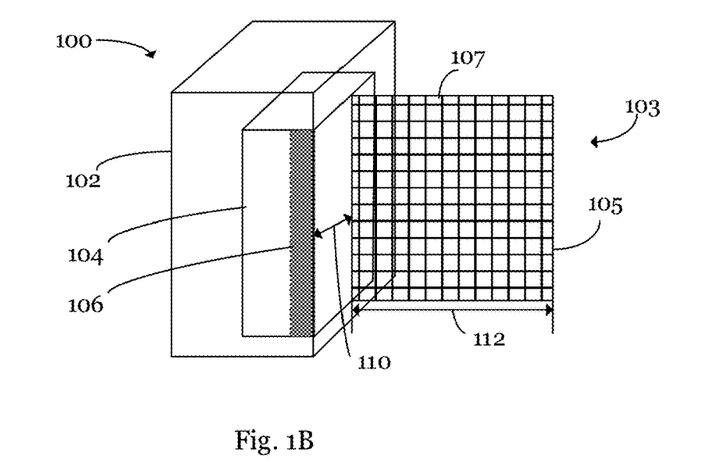
FIG. 1B illustrates a front view of the electronic device with the touch sensitive display in a fully unrolled position.
Figure 1C:
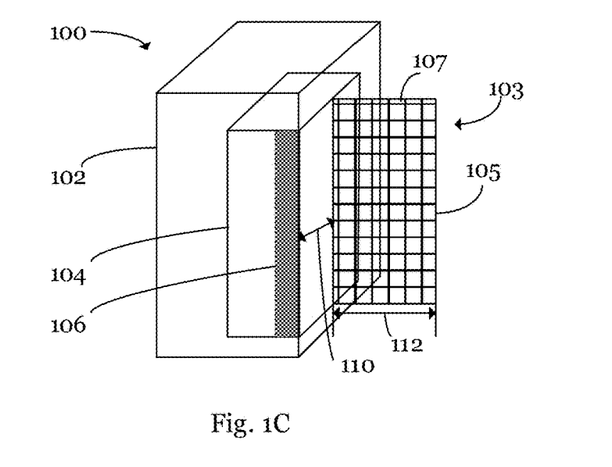
FIG. 1C illustrates a front view of the electronic device with the touch sensitive display in a partially unrolled position.
Figure 1D:
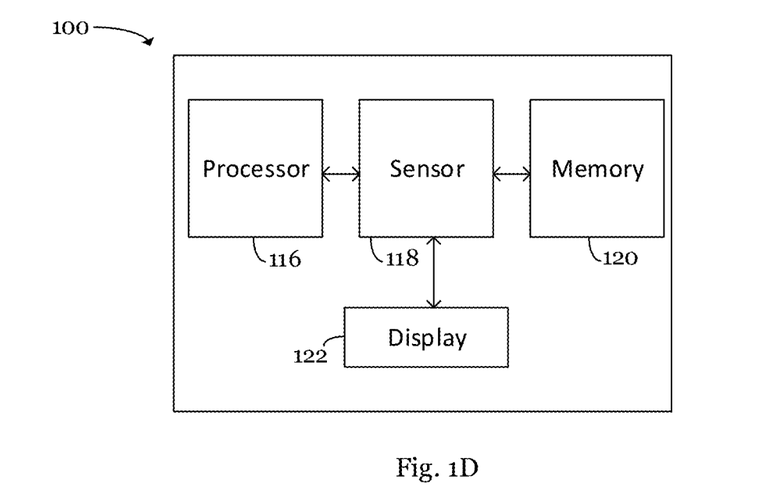
FIG. 1D illustrates a component schematic of the electronic device.
Figure 1E:
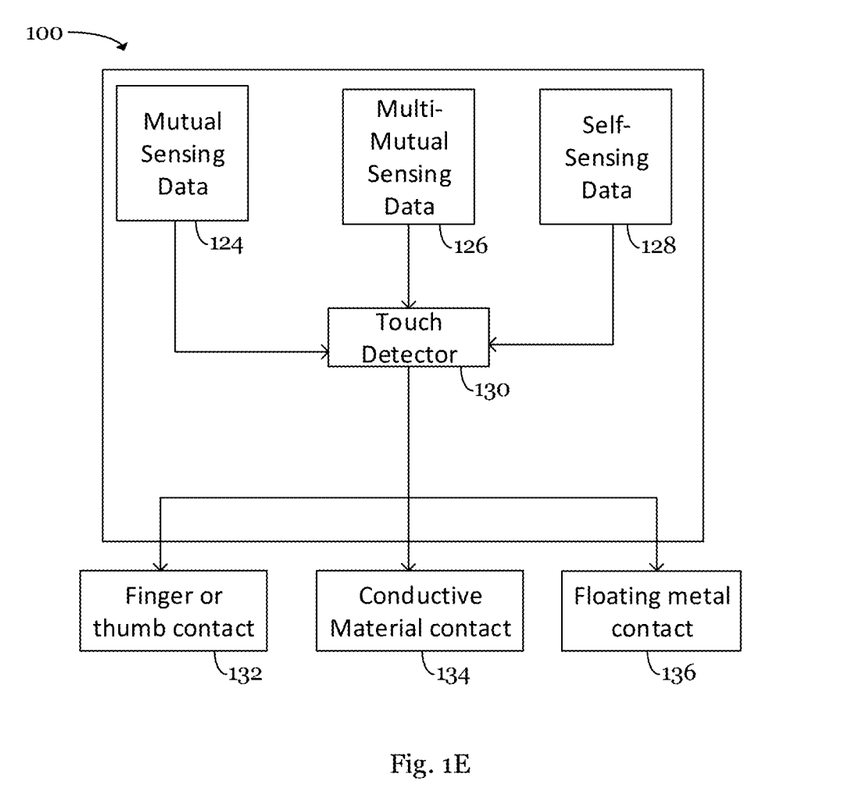
FIG. 1E illustrates the process of detecting various types of contact.
Figure 1F:
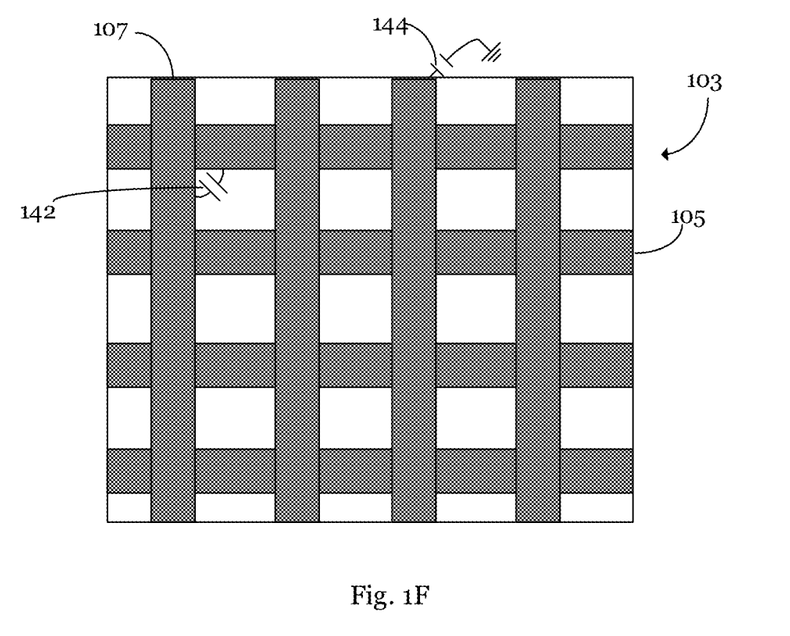
FIG. 1F illustrates a schematic of the rollable touch sensitive display.

FIGS. 1A-1F illustrate an electronic device having a touch sensitive display that is configured to be rolled or unrolled into a housing and determine the unrolled position of the touch sensitive display with in accordance with an embodiment of the invention, wherein FIG. 1A illustrates a front view of the electronic device with the touch sensitive display in a fully rolled position, FIG. 1B illustrates a front view of the electronic device with the touch sensitive display in a fully unrolled position, FIG. 1C illustrates a front view of the electronic device with the touch sensitive display in a partially unrolled position, FIG. 1D illustrates a component schematic of the electronic device, FIG. 1E illustrates the process of detecting various types of contact, and FIG. 1F illustrates a schematic of the rollable touch sensitive display.

FIG. 1A illustrates a schematic detailing an embodiment of an electronic device 100 configured with a rollable touch screen. The electronic device 100 comprises a retainment structure 104 disposed within a housing structure 102. In one or more embodiments, the housing structure 102 may further comprise auxiliary components (i.e. speakers, microphones, switches, etc.) that have been assembled into the housing structure 102 to provide various functionalities to the electronic device 100. The retainment structure 104 may further include an opening 101 from which a rollable touch screen can extend out.

The retainment structure 104 includes a conductive material 106 positioned close to the rollable touch screen. The conductive material 106 may comprise a conductive metal such as copper, aluminum, or any other type of conductive metal. The conductive material 106 may be disposed within the retainment structure in a manner such that there is a distance 11$o$ between the conductive material 106 and the opening 101 (or roughly the first side of the flexible touchscreen 103 mounted within the retainment structure 104).

FIG. 1B illustrates a schematic detailing of an embodiment of the front of the electronic device 100 when the flexible touchscreen is in the fully unrolled position.

Referring to FIG. 1B, a first side of the flexible touchscreen 103 is mounted within the retainment structure 104 and is configured to be rolled into or unrolled out of the retainment structure 104 in a direction perpendicular to the retainment structure 104. In some embodiments of the electronic device 100, a flexible display 122 (FIG. 1D) may be situated on the front facing side of the electronic device 100. The flexible display 122 may comprise a light emitting diode (LED) flexible display, organic LED flexible display, or any other type of flexible display. The flexible touchscreen 103 may be unrolled in a direction perpendicular to the retainment structure 104 to an unrolled position 112 that is a distance from the retainment structure 104. The unrolled position 112 is defined as the distance between the far end of the flexible touchscreen 103 and the retainment structure 104 (i.e. the distance to project an image across the flexible touch sensitive display).

The flexible touchscreen 103 may comprise a first plurality of capacitive electrodes 105 arranged in rows and a second plurality of capacitive electrodes 107 arranged in columns across the flexible touchscreen 103 in a grid like fashion. The first plurality of capacitive electrodes 105 and the second plurality of capacitive electrodes are arranged on the front facing side of the electronic device 100. The first plurality of capacitive electrodes 105 and the second plurality of capacitive electrodes 107 are placed on top of each other so as to form a matrix of capacitors (FIG. 1F).

In one or more embodiments, the far end of the touchscreen 103 may be mounted in a second retainment structure within a second housing. In one or more embodiments, the conductive material 106 may be disposed within the second retainment structure. In one more embodiments, the flexible touchscreen 103 may be configured to rolled or unrolled into the first retainment structure and the second retainment structure simultaneously in a scroll like fashion. For example, the user may extend the first housing and the second housing in opposite directions to enlarge the flexible touchscreen (and vice versa). For example, as the first housing and the second housing are extended in opposite directions the flexible touchscreen may be unrolled out of both the first retainment structure and the second retainment structure (and vice versa). In one or more embodiments, the flexible touchscreen 103 may be rolled or unrolled manually or automatically using a mechanical driving unit.

FIG. 1C illustrates a schematic detailing of an embodiment of the electronic device 100 when the flexible touchscreen 103 is in a partially unrolled position. Referring to FIG. 1C, in one or more embodiments, the flexible touchscreen 103 may be rolled from the fully unrolled display to a partially unrolled position. The flexible touchscreen 103 may be rolled or unrolled to any unrolled position 112 between the fully rolled position and the fully unrolled position. For example, the flexible touch sensitive display 103 can be unrolled from the fully rolled position to the fully unrolled position, from the fully rolled position to a partially unrolled position, from any partially unrolled position to another partially unrolled position, from any partially unrolled position to a fully unrolled position, or any other combination thereof.

In the illustrations shown in FIGS. 1A-1C, the front display of the electronic device 100 is oriented so that the flexible touchscreen 103 is placed in a landscape mode of operation. In the landscape mode of operation the flexible touchscreen 103 is rolled or unrolled in a horizontal direction. In other embodiments of the electronic device 100, the front display can be oriented so that the flexible touchscreen 103 is placed in a portrait mode of operation that is rolled or unrolled in a vertical direction.

Although the illustration of the electronic device 100 in FIGS. 1A-1C is similar to a mobile phone, in various embodiments, the electronic device 100 may include tablets, hand-held gaming units, and others.

FIG. 1D illustrates that the electronic device 100 may include a processor 116, a sensor 118, a memory 120, and a flexible display 122, which may be electronically coupled to each other through a bus.

The memory 120 may be programmed for short term and/or long term memory storage. The memory 120 may comprise various programs to be executed in the processor 116. The memory 120 may include both volatile and non-volatile memories. The memory 120 is designed to retain information generated by the processor 116 so it can be recalled at a later time.

The flexible touchscreen 103 is designed to register user input via touches made to its surface. In other embodiments of the electronic device 100, input from the flexible touchscreen 103 may also come from input given from a stylus device. In some embodiments, the flexible display 122 and the flexible touchscreen 103 may be integrated in one component. The sensor 118 may include the flexible touchscreen 103 as well as other sensors such as gyroscopes or accelerometers. One or more of the sensors may be integrated together.

The processor 116 analyzes information and carries out a series of executable scripts, e.g., stored in the memory 120, based on user input. The processor 116 may comprise an application-specific integrated circuit (ASIC) device, a system on chip (SOC), or any other processing unit known in the art. In various embodiments, the processor 116 may comprise a number of separate computing units such as cores integrated within one processor, or distinct separate processing chips. In other embodiments, some of the processing may be integrated with the sensor 118.

As will be described in detail further below, the processor 116 when executed analyzes groupings of touch values produced from a matrix of touch sensitive areas on the flexible touchscreen 103. Information gathered from the sensor 11 and the flexible touchscreen 103 is used to determine if the analyzed touch values define a touch by human fingers or thumbs, the conductive material 106, or a floating metal such as water droplets.

As explained above, the flexible touchscreen 103 may be rolled or unrolled into a variety of unrolled positions 112 perpendicular to the retainment structure 104, and therefore, may require extra power consuming circuit components to constantly monitor and determine its unrolled position 112.

To overcome issues related to the additional electronical components required to monitor and determine the unrolled position of the flexible touchscreen 103, embodiments as next described using FIGS. 1E-1F, analyze data from mutual sensing data 124, multi-mutual sensing data 126, and self-sensing data 128. The mutual sensing data 124, the multi-mutual sensing data 126 and the self-sensing data 128 may be used to report the location in which the flexible touchscreen 103 is detecting the conductive material 106.

Mutual sensing data 124 includes driving each row of the first plurality of capacitive electrodes 105 sequentially and measuring the change in capacitance due to a change in a dielectric medium between the intersecting electrodes of the second plurality of capacitive electrodes 107 and a respective driven row of the first plurality of capacitive electrodes 105 (or vice versa).

Multi-mutual sensing data 126 includes driving each row of the first plurality of capacitive electrodes 105 simultaneously and measuring the change in capacitance due to a change in a dielectric medium between the intersecting electrodes (the first plurality of capacitive electrodes 105 and the second plurality of capacitive electrodes 107).

Self-sensing data 128 measures a change in sensed capacitance each of the first plurality of capacitive electrodes 105 or each of the second plurality of capacitive electrodes 107. More information regarding the facets of mutual sensing data 124, multi-mutual sensing data 126, and self-sensing data 128 will be described further below.

The sensing data gathered from all three types of sensing are used as input by the touch detector 130. The touch detector applies a system of process steps (which are detailed below) to the received sensing in order to determine the unrolled position 112 of the flexible touchscreen 103. After a detailed analysis, the touch detector 130 determines whether the sensed data includes contact by fingers or thumbs 132, contact by a floating metal 136, or contact by the conductive material 134, and then determines the unrolled position 112 of the flexible touchscreen 103.

In embodiments of the invention, the touch detector 130 may analyze groupings or raw touch values produced by all three types of sensing. Then, based on the groupings of raw data, the touch detector may determine different sets of detection locations. For example, the touch detector may determine a plurality of mutual sensing locations, a plurality of multi-mutual sensing locations, and a plurality of self-sensing locations. Using each of the detection locations, the touch detector 130 may decipher the location in which the flexible touchscreen 103 is detecting the conductive material 106. Based on the location in which the flexible touchscreen 103 is detecting the conductive material 106, the touch detector 130 may then determine the unrolled position 112 of the flexible touchscreen 103.

In various embodiments of the invention, the touch detector 130 may be a program that is stored in memory 120 an executed in processor 116 based on the inputs received at the sensor 118. For example, the touch detector may comprise a program comprising instructions to execute the flow chart of FIG. 3.

FIG. 1F illustrates a schematic of the rollable touch sensitive display. As mentioned earlier, the flexible touchscreen 103 is electrically coupled to a first plurality of capacitive electrodes 105 and a second plurality of capacitive electrodes 107 that span the entirety of the flexible touchscreen 103 in a grid-like fashion. The rows of the first plurality of capacitive electrodes 105 and the columns of the second plurality of capacitive electrodes 107 have a measurable mutual capacitance so as to form a matrix of mutual capacitors 142. Each of the rows of the first plurality of capacitive electrodes 105 and each of the columns of the second plurality of capacitive electrodes 107 may have a self-capacitance 144 that may be measured with respect to ground.

Representative measurement data will first be described using FIG. 2 before discussing the flow chart that implements the touch detector 130.

FIG. 2 illustrates an exemplary electronic readout of touch values detected by an electronic device that includes mutual sensing data, self-sensing data, and multi-mutual sensing data in accordance with an embodiment of the present invention.

Referring to FIG. 2, the flexible touchscreen 103 is detecting two capacitive objects at different detection locations. The first capacitive object 201 is a finger directly touching the flexible touchscreen 103. The second capacitive object 207 is the conductive material 106 that is located a distance 110 away from the flexible touchscreen 103.

According to an embodiment of the invention, as described above, the touch values 203 pertain to capacitive-based information generated from the first plurality of capacitive electrodes 105 and the second plurality of capacitive electrodes 107. Information pertaining to the detection locations (i.e., x- and y-coordinates) that the flexible touchscreen 103 is detecting the first capacitive object 201 and the second capacitive object 207 can be obtained.

The electronic readout 200 comprises touch values 203 arranged as mutual sensing touch values 206, self-sensing touch values 204, and multi-mutual sensing values 202. Based on each of the respective arrangements of touch values, a plurality of mutual sensing locations, a plurality self-sensing locations, and a plurality of multi-mutual sensing locations may be determined. Then, each of the respective locations may be used to determine the unrolled position 112 of the flexible touchscreen 103.

The mutual sensing touch values 206 are arranged in a matrix like fashion. In one or more embodiments, the mutual sensing process includes a controller such as the processor 116 (FIG. 1D) selecting and driving a particular row of the first plurality of capacitive electrodes 105 (e.g. X0) with a voltage and scanning every column of the second plurality of capacitive electrodes 107 (e.g. Y0, Y1, Y2, . . . , Yn). In this manner, the change in the mutual capacitance (e.g. the mutual capacitance of the mutual capacitors 142 in FIG. 1F) at each intersection between the electrodes of a respective driven row of the first plurality of capacitive electrodes 105 and electrodes of the second plurality of capacitive electrodes 107 is measured, resulting in mutual sensing touch values 206 (e.g. X0Y0, X0Y1, X0Y2, . . . , X0Yn). This process is repeated sequentially for each row of the first plurality of capacitive electrodes 105 to form the rest of the matrix of the mutual sensing touch values 206.

In other words, during the mutual sensing process when a row of the first plurality of capacitive electrodes 105 is driven, electric fields form between adjacent electrodes of the driven row and the respective intersecting columns of the second plurality of capacitive electrodes 107. When capacitive objects such as human fingers, a stylus, or a floating metal touch the flexible touchscreen 103, the electric field lines going through the air between adjacent electrodes is replaced to pass through the capacitive objects. These interruptions in the electric fields cause a detectable in change the mutual capacitance of the mutual capacitors 142 where the touches occurred. However, the mutual sensing process cannot detect capacitive objects away from the flexible touchscreen 103, such as the conductive material 106.

Accordingly, based on the mutual sensing touch values 206, mutual sensing locations may be determined. In one or more embodiments, the mutual sensing locations are the areas of the mutual sensing touch values 206 where peaks exist (i.e. the changes in capacitance). The peaks are where the mutual sensing touch values 206 where are greater than a pre-set threshold value.

Referring to FIG. 2, in one embodiment, the only capacitive object directly touching the flexible touchscreen 103 is the first capacitive object 201, i.e., the finger. Therefore, a mutual sensing location 212 exists where the finger is touching the flexible touchscreen 103. Although FIG. 2 illustrates one mutual sensing location 212, this is not indicative of possible number of mutual sensing locations. In one or more embodiments, flexible touchscreen 103 may detect multiple mutual sensing locations based on multiple capacitive objects directly touching the flexible touchscreen 103. For example if multiple fingers and a water droplet (floating metal) are touching the flexible touchscreen 103, multiple mutual sensing locations may exist. In one or more embodiments, a conductive object (finger/water droplet) may not be in direct contact with the flexible touchscreen 103 and a mutual sensing location may not exist.

In one or more embodiments, the self-sensing touch values 204 may be arranged in rows and/or columns. In one embodiment, the self-sensing process includes the controller driving (with a voltage) and scanning each of the individual columns of the second plurality of capacitive electrodes 107. In other embodiments, the self-sensing process may include driving and scanning each of the individual rows of the first plurality of capacitive electrodes 105. In one or more embodiments, the self sensing process may include driving and scanning each of the individual rows and columns of capacitive electrodes. During the self-sensing process, the self-capacitance (e.g. the self-capacitance 144 in FIG. 1F) of each of the individual rows and columns of capacitive electrodes are measured to obtain self-sensing touch values. When a human finger is brought proximate to a driven row or column of electrodes it adds an additional capacitance that can be measured. In one or more embodiments, the additional capacitance results in a charge transfer and therefore a flow of current that may be measured. However, the exact detection location cannot be determined using self-sensing other then determining that it is located on the selected row and/or column. Therefore, as a practical matter, the self-sensing process can determine the position of touch on the flexible touchscreen 103, but not the exact coordinate. In embodiments where only the rows or columns of capacitive electrodes are driven and scanned, the self-sensing touch values may be arranged in a single column or row, respectively. In embodiments where both the rows and columns are driven and scanned the self-sensing touch values may be arranged in a row and a column. For example, referring to FIG. 2, only the second plurality of electrodes 107 are driven and scanned. Therefore, in one embodiment, the self-sensing touch values 204 may be arranged in a single row because a single capacitance for each individual column of the second plurality of capacitive electrodes 107 is being measured.

Accordingly a self-sensing location 210 may be determined based on the self-sensing touch values 204. In one or more embodiments, the self-sensing location 210 is the area of the self-sensing touch values 204 where peaks exist (i.e. the largest self-capacitance). The peaks are the area where the self-sensing touch values 204 are greater than a pre-set threshold value. In one or more embodiments, the self-sensing location 210 may represent a location of human touch.

In one or more embodiments, the self-sensing location may be compared to the mutual sensing locations to detect the presence of a floating metal (water). However, the self-sensing location cannot detect floating metal. Therefore, finger touches are present in locations that are detected by both mutual sensing and self-sensing.

As explained above, in one or more embodiments, a human finger may not be in direct contact with the flexible touchscreen 103 and a self-sensing location may not exist. Referring to FIG. 2, the first detected capacitive object 201 is a finger. Therefore, a self-sensing location 210 exists across the same columns as the mutual sensing location 212. Therefore, it can be determined that the mutual sensing location 212 is detecting human touch and not floating metals or water.

The multi-mutual sensing values 202 are arranged in either a single row (landscape mode) or column (portrait mode). In one or more embodiments, the multi-mutual sensing process operates in a similar manner to the mutual sensing process described above, except that each of the rows is driven simultaneously. However, because each of the rows of the first plurality of capacitive electrodes 105 is driven simultaneously, the mutual capacitances of the mutual capacitors 142 of each respective columns are added in parallel providing multi-mutual sensing values 206 for each of the plurality of columns across the flexible touchscreen (e.g. Y1, Y2, . . . , Yn).

Advantageously the multi-mutual scanning process drives each of the plurality of first electrodes or each of the plurality of second electrodes simultaneously whereas the mutual sensing process drives them sequentially. One advantage of this is that it produces a stronger signal than the mutual sensing process and can detect multiple capacitive objects that are directly touching (e.g. human fingers) or are a distance away from the flexible touchscreen 103 such as the conductive material 106.

Referring to FIG. 2, the multi-mutual sensing process is detecting contact from both capacitive objects at two separate multi-mutual sensing locations, for example, a first multi-mutual sensing location 208 and a second multi-mutual sensing location 209. The second multi-mutual sensing location 209 matches with the detection of the first capacitive object 201 (self-sensing location 210 and the mutual sensing location 212). However, the first multi-mutual sensing location 208 is not detected by the self sensing and mutual sensing. Therefore, it is determined that the first multi-mutual sensing location 208 relates to the detection of the conductive material 106 of the retainment structure.

A first multi-mutual sensing location 208 is detecting the second capacitive object 207, the conductive material 106 within the retainment structure 104. A second multi-mutual sensing location 209 is detecting the first capacitive object 201, the finger. Although FIG. 2 represents two multi-mutual sensing locations, this is not representative of the number of multi-mutual sensing locations. For example, more multi-mutual sensing locations may exist if there are multiple touches by human fingers and/or touch by a floating metal, along with the detection of the conductive material 106.

Based on the multi-mutual sensing locations, the location on the flexible touchscreen 103 detecting the conductive material 106 may be determined. Advantageously, as explained above, the multi-mutual sensing process is the only process that can detect the conductive material 106. Therefore, if a multi-mutual sensing location is not detected by the mutual sensing process, that multi-mutual sensing location is the detection location of the conductive material 106.

After determining the location of the flexible touchscreen 103 where the conductive material 106 is detected, the unrolled position 112 of the flexible touchscreen 103 may be determined. As illustrated in FIG. 2, multiple multi-mutual sensing values are included in the first multi-mutual sensing location 208. Although there is a peak multi-mutual touch value within the first multi-mutual sensing location 208, the peak is not necessarily the exact coordinate of where the flexible touchscreen 103 is detecting touch from the conductive material 106. For example environmental factors or parasitic capacitances due to poor grounding, for example, can alter the multi-mutual sensing values 202. Therefore, to accurately determine the unrolled position 112 of the flexible touchscreen 103, the exact touch coordinate (in landscape mode) or vertical coordinate (in portrait mode) must be determined. In one or more embodiments, the peak multi-touch value within the first multi-mutual sensing location 208 may be determined by a conventional centroid method. In one or more embodiments, the centroid method may comprise finding a local maximum touch value within the multi-mutual sensing location that is sensing the conductive material 106. Then, weights are applied to the remaining multi-mutual touch values within said multi-mutual location based on their distance from the local maximum. Using the weights and the position of the multi-mutual touch values, a centroid is formed to find the exact detection location of the conductive material 106 on the flexible touchscreen 103.

Advantageously, as described above, the multi-mutual process is an independent sensing process and is the only sensing process that can detect the conductive material 106. One advantage of this is that unrolled position 112 of the flexible touchscreen 103 can be determined without adding additional layers or components that consume additional power. Another advantage is that the multi-mutual process is separate from the typical sensing process (i.e. the mutual sensing process combined with the self-sensing process), and therefore, may detect the unrolled position 112 of the flexible touchscreen 103 while the electronic device 100 is turned off.

FIG. 3 illustrates an exemplary electronic readout of touch values detected by an electronic device that includes mutual sensing data, self-sensing data, and multi-mutual sensing data in accordance with an embodiment of the present invention.

Referring to FIG. 3, the flexible touchscreen 103 is detecting three capacitive objects at different detection locations. The first capacitive object 201 is a first finger directly touching the flexible touchscreen 103. The second capacitive object 207 is the conductive material 106 that is located a distance 11o away from the flexible touchscreen 103. The third capacitive object 300 is a second finger directly touching the flexible touch screen 103. Accordingly, FIG. 3 is described with reference to FIG. 2.

Referring to FIG. 3, electronic readout 200 comprises touch values 203 arranged as mutual sensing touch values 206, self-sensing touch values 204, and multi-mutual sensing touch values 202. However, as explained above, in or more embodiments the self-sensing process may include driving, sensing, and measuring the self-capacitance of each of the individual rows and columns of capacitive electrodes. Therefore, as illustrated in FIG. 3, the self-sensing touch values are arranged in a row 204 and a column 301.

Accordingly, the self-sensing process is detecting three additional self-sensing locations. A second self-sensing location 304 is detecting the third capacitive object 300 within the row of self-sensing touch values 204. A third self-sensing location 308 is detecting the first capacitive object 201 across the column of the self-sensing touch values 301. A fourth self-sensing location 310 is detecting the third capacitive object 300 across the column of self-sensing touch values 301.

The mutual sensing touch values 206 are arranged in a matrix like fashion for the reasons described above. However, due to the additional direct touch by the third capacitive object 300, a second mutual sensing location 306 exists. As explained above, the mutual sensing process is unable to detect the conductive object 106 because it is not directly touching the flexible touchscreen 103.

As explained above, the self-sensing locations may be compared to the mutual sensing locations to detect the presence of a floating metal. Referring to FIG. 3, the first and third capacitive objects are fingers directly touching the flexible touchscreen 103. Therefore, the first and second self-sensing locations 210 and 304 across the row of self-sensing touch values 204 exist in the same respective columns as the first and second mutual sensing locations 212 and 306. Similarly, the third and fourth self-sensing touch locations across the column of the self-sensing touch values 301 exist in the same respective rows as the first and second mutual sensing locations 212 and 306. Thus, it may be determined that the first mutual sensing location 212 and the second mutual sensing location 306 are detecting human touch and not floating metals.

The multi-mutual sensing touch values 202 are arranged in a single row in the same manner described above. However a third multi-mutual sensing location 302 exists where the third capacitive object 300 is touching the flexible touch screen 103. Therefore, as described above, the first multi-mutual sensing location 208 is still not detected by the mutual sensing process and the self-sensing process. Thus, it is determined that the first multi-mutual sensing location 208 still relates to the detection of the conductive material 106 within the retainment structure.

After determining the location of the flexible touchscreen 103 where the conductive material 106 is detected, the unrolled position 112 of the flexible touchscreen may be determined in the same manner described in FIG. 2.

FIG. 4 illustrates a process flow, as performed at the touch detector 130 of FIG. 1E, to determine the unrolled position of the touch sensitive display based on an analysis of the mutual sensing touch values, the self-sensing touch values, and the multi-mutual sensing values in accordance with an embodiment of the present invention.

As illustrated in block 400 and described with reference to FIG. 2 and FIG. 3, a plurality of mutual sensing detection locations, a plurality of self-sensing locations, and a plurality of multi-mutual sensing locations may be determined. In one or more embodiments, the plurality of mutual sensing locations are based on mutual sensing touch values 206 obtained using a mutual sensing process in the same manner described in FIG. 2. In one or more embodiments, the plurality of self-sensing locations are based on self-sensing touch values 204 and/or 301 obtained using a self-sensing process in the same manner described in FIG. 2. In one or more embodiments, the multi-mutual sensing locations are based on multi-mutual sensing values 202 obtained based on a multi-mutual sensing process in the same manner described in FIG. 2.

In the example provided in FIG. 3, three capacitive objects are detected at different locations. The first capacitive object 201 being a first finger, the second capacitive object 207 being the conductive material 106, and the third capacitive object 300 being a second finger. As explained above, the mutual sensing process is able to detect contact by capacitive objects that directly touch the flexible touchscreen 103. Therefore, two mutual sensing locations 212 and 306 exist where the first capacitive object 201 and the third capacitive object 300 are detected in this specific example. Similarly, as explained above, the self-sensing process can only detect direct instances of touch. Therefore, a first, second, third, and a fourth self-sensing location 210, 304, 308, and 310 exist where the first capacitive object 201 and the third capacitive object 300 is detected in this specific example. Also, as explained above the multi-mutual sensing process can detect capacitive objects that are brought near the flexible touchscreen 103 and directly touch the flexible touchscreen 103. Therefore, a first multi-mutual sensing location 208 exists where the second capacitive object 207 is detected, a second multi-mutual location 209 exists where the first capacitive object 201 is detected, and a third multi-mutual sensing location 302 exists where the third capacitive object is detected in this specific example.

As next described in block 402 and described with reference to FIG. 2 and FIG. 3, the self-sensing locations may be compared to the plurality of mutual sensing locations to detect the presence of a floating metal (water droplets). As explained above, the mutual sensing process is able to detect the presence of floating metals but the self-sensing process cannot. Therefore, if a self-sensing location is not located within the same rows and/or columns of a mutual sensing location, the touch is due to a floating metal.

In the specific example in FIG. 3, the self-sensing locations exist across the same respective rows and columns as mutual sensing locations. Therefore, it can be determined the mutual sensing locations is detecting human touch and no floating metals were detected.

As next illustrated in block 404 and described with reference to FIG. 2 and FIG. 3, a location detected only by the multi-mutual scanning process is determined. A detection location is determined by the multi-mutual scanning process if a multi-mutual location is not included in the same columns (in landscape mode) or the same rows (in portrait mode) as the mutual sensing locations and the self-sensing locations. As explained above, the location only detected by the multi-mutual scanning process is where the conductive material 106 is detected.

In the specific example of FIG. 3, the first multi-mutual sensing location 208 is not included in the same columns as the other detection locations. Therefore, the first multi-mutual sensing location 208 is the detection location of the conductive material 106.

As next described in block 406 and described with reference to FIG. 2 and FIG. 3, after determining a location detected only by the multi-mutual scanning process, the unrolled position 112 of the flexible touchscreen 103 may be determined.

First the exact coordinate of the location of the conductive material 106 is detected may be determined to accurately determine the unrolled position 112 of the flexible touchscreen 103. In one or more embodiments, in order to determine the exact coordinate of where the conductive material 106 is detected, a centroid method may be used as described in FIG. 2. Then, the unrolled position 112 of the flexible touchscreen 103 may be determined by taking the difference of the coordinate of the detection location of the conductive material 106 and the fully unrolled length of the flexible touchscreen 103.

As next described in block 408, the touch detector 130 shares the position of the flexible touchscreen 103 with the electronic device 100.

Figure 5A:
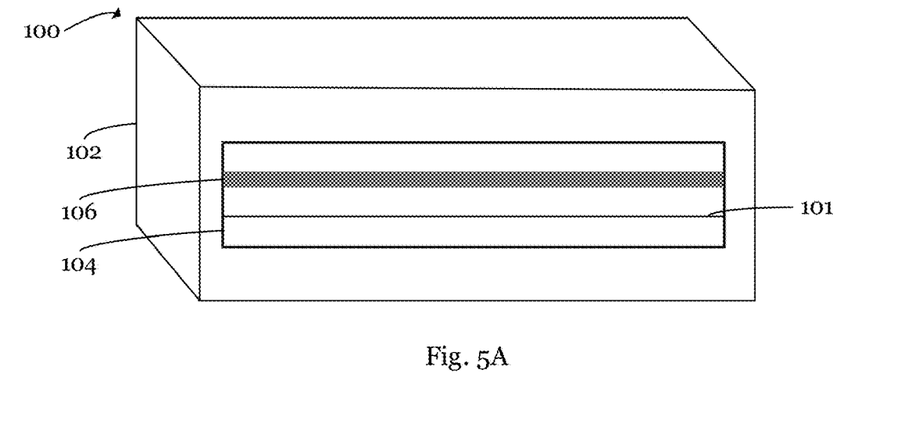
FIGS. 5A-5C illustrate an electronic device having a touch sensitive display that is configured to be rolled or unrolled out of a housing and determine the unrolled position of the touch sensitive display in accordance with an embodiment of the invention, where
Figure 5B:
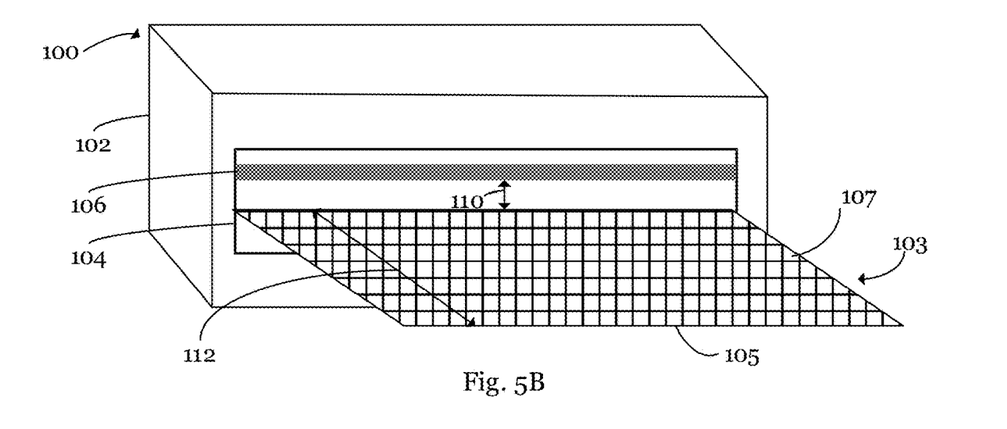
Figure 5C:
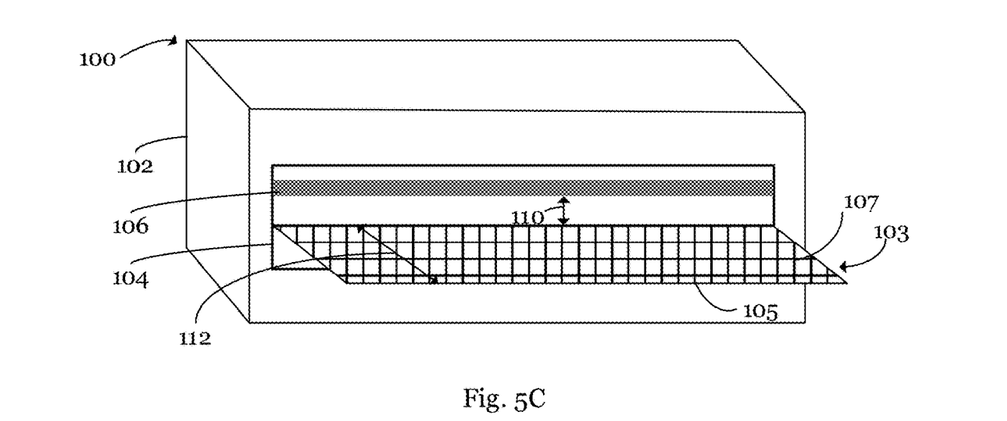

FIGS. 5A-5C illustrates a further embodiment of the present invention in which an electronic device 100 is operating in portrait mode. Therefore, the rows and columns are switched. Otherwise this embodiment may be described in the same manner as FIGS. 1A-1C.

Example embodiments of the invention are summarized here. Other embodiments can also be understood from the entirety of the specification as well as the claims filed herein.

Example 1. A method for operating an electronic device, the method including: having a touch sensitive display with a first side of the touch sensitive display mounted in a first retainment structure that is disposed within a first housing, the touch sensitive display configured to be rolled into or unrolled out of the first retainment structure along a first direction, where the first retainment structure includes a conductive material disposed within the first retainment structure, and where the touch sensitive display includes a first plurality of capacitive electrodes arranged in rows across the touch sensitive display and a second plurality of capacitive electrodes arranged in columns across the touch sensitive display; unrolling or rolling the touch sensitive display to an unrolled position along the first direction; determining that the touch sensitive display is detecting contact at a plurality of mutual sensing locations using a mutual sensing process; determining that the touch sensitive display is detecting contact at a plurality self-sensing locations using a self-sensing process; determining a plurality of multi-mutual sensing locations based on multi-mutual sensing values obtained from a multi-mutual sensing process; and determining the unrolled position along the first direction based on the plurality of mutual sensing locations, the plurality self-sensing locations, and the plurality of multi-mutual sensing locations.

Example 2. The method of example 1, where determining the plurality of multi-mutual sensing locations includes: driving each of the rows including the first plurality of capacitive electrodes simultaneously; and scanning each of the columns including the second plurality of capacitive electrodes and measuring the change in capacitance at each intersection between each of the columns including the second plurality of capacitive electrodes and each of the rows including the first plurality of capacitive electrodes to obtain multi-mutual sensing values; and determining the plurality of multi-mutual sensing locations based on the multi-mutual sensing values.

Example 3. The method of one of examples 1 or 2, where determining that the touch sensitive display is detecting contact at the plurality of mutual sensing locations includes: driving each of the rows including the first plurality of capacitive electrodes sequentially; scanning each of the columns including the second plurality of capacitive electrodes and measuring the change in capacitance at each intersection between each of the columns including the second plurality of capacitive electrodes and each respective driven row of the first plurality of capacitive electrodes to obtain mutual sensing touch values; and determining the plurality of mutual sensing locations based on the mutual sensing touch values.

Example 4. The method of one of examples 1 to 3, where determining that the touch sensitive display is detecting contact at the plurality of self-sensing locations includes: driving and scanning each of the columns including the second plurality of capacitive electrodes; measuring the self-capacitance of each of the columns including the second plurality of capacitive electrodes with respect to ground to obtain self-sensing touch values; and determining the plurality of self-sensing locations based on the self-sensing touch values.

Example 5. The method of one of examples 1 to 4, where determining that the touch sensitive display is detecting contact at the plurality of self-sensing locations includes: driving and scanning each of the rows including the first plurality of capacitive electrodes and each of the columns including the second plurality of capacitive electrodes; measuring the self-capacitance of each of the rows including the first plurality of capacitive electrodes and each of the columns including the second plurality of capacitive electrodes with respect to ground to obtain self-sensing touch values; and determining the plurality of self-sensing locations based on the self-sensing touch values.

Example 6. The method of one of examples 1 to 5, further including: determining that the touch sensitive display is detecting the conductive material at a first multi-mutual sensing location of the plurality of multi-mutual sensing locations based on a determination that the first multi-mutual sensing location is not located in any of the same locations as any of the plurality of mutual sensing locations and the plurality of self-sensing locations.

Example 7. The method of one of examples 1 to 6, further including determining an exact location on the touch sensitive display that is detecting the conductive material using a centroid method.

Example 8. The method of one of examples 1 to 7, further including determining the unrolled position of the touch sensitive display along the first direction based on the difference between the fully unrolled length of the touch sensitive display and the exact location on the touch sensitive display that is detecting the conductive material.

Example 9. The method of one of examples 1 to 8, further including determining that the touch sensitive display is detecting contact of a floating metal based on a determination that a first mutual sensing location of the plurality of mutual sensing locations is different from each of the plurality of self-sensing locations.

Example 10. A method for operating an electronic device including: having a rollable display configured to be rolled into or unrolled out of a housing, the unrolled portion of the rollable display at an unrolled position extending away from the housing in a first direction, the housing including a conductive material configured to be capacitively sensed by a capacitive touch screen on the rollable display; and determining that the rollable display is detecting the conductive material at a location on the capacitive touch screen using a multi-mutual sensing process; and determining the unrolled position of the rollable display along the first direction based on the location on the capacitive touch screen.

Example 11. The method of example 10, where the capacitive touch screen includes a first plurality of capacitive electrodes arranged in rows across the capacitive touch screen and a second plurality of capacitive electrodes arranged in columns across the capacitive touch screen; and where determining that the rollable display is detecting the conductive material includes driving each of the rows including the first plurality of capacitive electrodes simultaneously; and scanning each of the columns including the second plurality of capacitive electrodes and measuring the change in capacitance at each intersection between each of the columns including the second plurality of capacitive electrodes and each of the rows including the first plurality of capacitive electrodes to obtain multi-mutual sensing values; and determining the location on the capacitive touch screen based on the multi-mutual sensing values.

Example 12. The method of one of examples 10 or 11, where determining that the rollable display is detecting the conductive material includes: based on a plurality of self-sensing touch values sensed on the capacitive touch screen, determining that the capacitive touch screen is not detecting contact at the location; and based on a plurality of multi-mutual sensing values sensed on the capacitive touch screen, determining that the capacitive touch screen is not detecting contact at the location.

Example 13. The method of one of examples 10 to 12, where determining that the rollable display is detecting the conductive material at a location includes determining an exact location on the capacitive touch screen that is detecting the conductive material using a centroid method.

Example 14. An electronic device including: a first housing; a first retainment structure disposed within the first housing; a conductive material disposed within the first retainment structure; a touch sensitive display having a first side mounted within the first retainment structure, where the touch sensitive display is configured to be rolled into or unrolled out of the first retainment structure to an unrolled position along a first direction, and where the touch sensitive display includes a first plurality of capacitive electrodes arranged in rows across the touch sensitive display and a second plurality of capacitive electrodes arranged in columns across the touch sensitive display; a processor; a memory for storing a program to be executed in the processor, the program including instructions when executed cause the processor to: determine that the touch sensitive display is detecting contact at a plurality of mutual sensing locations; determine that the touch sensitive display is detecting contact at a plurality self-sensing locations; determine that the touch sensitive display is detecting a plurality of multi-mutual sensing locations; and determine the unrolled position of the touch sensitive display based on the plurality of mutual sensing locations, the plurality self-sensing locations, and the plurality of multi-mutual sensing locations.

Example 15. The device of example 14, where the conductive material is disposed within the first retainment structure in a manner such that there is a distance between the touch sensitive display and the conductive material within the first retainment structure.

Example 16. The device of one of examples 14 or 15, where instructions for determining that the touch sensitive display is detecting a plurality of multi-mutual sensing locations further include instructions that cause the processor to: drive each of the rows including the first plurality of capacitive electrodes simultaneously; and scan each of the columns including the second plurality of capacitive electrodes and measuring the change in capacitance at each intersection between each of the columns including the second plurality of capacitive electrodes and each of the rows including the first plurality of capacitive electrodes to obtain multi-mutual sensing values; and determine the plurality of multi-mutual sensing locations based on the multi-mutual sensing values.

Example 17. The device of one of examples 14 to 16, where instructions for determining that the touch sensitive display is detecting the plurality of mutual sensing locations further include instructions that cause the processor to: drive each of the rows including the first plurality of capacitive electrodes sequentially; scan each of the columns including the second plurality of capacitive electrodes and measuring the change in capacitance at each intersection between each of the columns including the second plurality of capacitive electrodes and each respective driven row of the first plurality of capacitive electrodes to obtain mutual sensing touch values; and determine the plurality of mutual sensing locations based on the mutual sensing touch values.

Example 18. The device of one of examples 14 to 17, where instructions for determining that the touch sensitive display is detecting contact at the plurality of self-sensing locations further include instructions that cause the processor to: drive and scan each of the columns including the second plurality of capacitive electrodes; measure the capacitance of each of the columns including the second plurality of capacitive electrodes with respect to ground to obtain self-sensing touch values; and determine the self-sensing location based on the self-sensing touch values.

Example 19. The device of one of examples 14 to 18, where instructions for determining that the touch sensitive display is detecting contact at the plurality self-sensing locations further include instructions that cause the processor to: drive and scan each of the rows including the first plurality of capacitive electrodes and each of the columns including the second plurality of capacitive electrodes; measure the capacitance of each of the rows including the first plurality of capacitive electrodes and each of the columns including the second plurality of capacitive electrodes with respect to ground to obtain self-sensing touch values; and determine the plurality self-sensing locations based on the self-sensing touch values.

Example 20. The device of one of examples 14 to 19, where the program includes further instructions that when executed cause the processor to: determine that the touch sensitive display is detecting the conductive material at a first multi-mutual sensing location of the plurality of multi-mutual sensing locations based on a determination that the first multi-mutual sensing location is not located in any of the same locations as any of the plurality of mutual sensing locations and the plurality self-sensing locations; determine an exact location on the touch sensitive display that is detecting the conductive material using a centroid method; and determine the unrolled position of the touch sensitive display along the first direction based on the difference between the fully unrolled length of the touch sensitive display and the exact location on the touch sensitive display that is detecting the conductive material.

Example 21. The device of one of examples 14 to 20, where a second side of the touch sensitive display is mounted with a second retainment structure disposed within a second housing.

Example 22. The device of one of examples 14 to 21, where the conductive material is disposed within the second retainment structure.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for operating an electronic device, the method comprising:
    having a touch sensitive display with a first side of the touch sensitive display mounted in a first retainment structure that is disposed within a first housing, the touch sensitive display configured to be rolled into or unrolled out of the first retainment structure along a first direction, wherein the first retainment structure includes a conductive material disposed within the first retainment structure, and wherein the touch sensitive display comprises a first plurality of capacitive electrodes arranged in rows across the touch sensitive display and a second plurality of capacitive electrodes arranged in columns across the touch sensitive display;
    unrolling or rolling the touch sensitive display to an unrolled position along the first direction;
    determining that the touch sensitive display is detecting contact at a plurality of mutual sensing locations using a mutual sensing process;
    determining that the touch sensitive display is detecting contact at a plurality self-sensing locations using a self-sensing process;
    determining a plurality of multi-mutual sensing locations based on multi-mutual sensing values obtained from a multi-mutual sensing process; and
    determining the unrolled position along the first direction based on the plurality of mutual sensing locations, the plurality of self-sensing locations, and the plurality of multi-mutual sensing locations.

2. The method of claim 1, wherein determining the plurality of multi-mutual sensing locations comprises:
    driving each of the rows comprising the first plurality of capacitive electrodes simultaneously; and
    scanning each of the columns comprising the second plurality of capacitive electrodes and measuring the change in capacitance at each intersection between each of the columns comprising the second plurality of capacitive electrodes and each of the rows comprising the first plurality of capacitive electrodes to obtain multi-mutual sensing values; and
    determining the plurality of multi-mutual sensing locations based on the multi-mutual sensing values.

3. The method of claim 1, wherein determining that the touch sensitive display is detecting contact at the plurality of mutual sensing locations comprises:
    driving each of the rows comprising the first plurality of capacitive electrodes sequentially;
    scanning each of the columns comprising the second plurality of capacitive electrodes and measuring the change in capacitance at each intersection between each of the columns comprising the second plurality of capacitive electrodes and each respective driven row of the first plurality of capacitive electrodes to obtain mutual sensing touch values; and
    determining the plurality of mutual sensing locations based on the mutual sensing touch values.

4. The method of claim 1, wherein determining that the touch sensitive display is detecting contact at the plurality of self-sensing locations comprises:
    driving and scanning each of the columns comprising the second plurality of capacitive electrodes;
    measuring a self-capacitance of each of the columns comprising the second plurality of capacitive electrodes with respect to ground to obtain self-sensing touch values; and
    determining the plurality of self-sensing locations based on the self-sensing touch values.

5. The method of claim 1, wherein determining that the touch sensitive display is detecting contact at the plurality of self-sensing locations comprises:
    driving and scanning each of the rows comprising the first plurality of capacitive electrodes and each of the columns comprising the second plurality of capacitive electrodes;
    measuring a self-capacitance of each of the rows comprising the first plurality of capacitive electrodes and each of the columns comprising the second plurality of capacitive electrodes with respect to ground to obtain self-sensing touch values; and
    determining the plurality of self-sensing locations based on the self-sensing touch values.

6. The method of claim 1, further comprising:
    determining that the touch sensitive display is detecting the conductive material at a first multi-mutual sensing location of the plurality of multi-mutual sensing locations based on a determination that the first multi-mutual sensing location is not located in any of the same locations as any of the plurality of mutual sensing locations and the plurality of self-sensing locations.

7. The method of claim 6, further comprising determining an exact location on the touch sensitive display that is detecting the conductive material using a centroid method.

8. The method of claim 7, further comprising determining the unrolled position of the touch sensitive display along the first direction based on a difference between a fully unrolled length of the touch sensitive display and the exact location on the touch sensitive display that is detecting the conductive material.

9. The method of claim 1, further comprising determining that the touch sensitive display is detecting contact of a floating metal based on a determination that a first mutual sensing location of the plurality of mutual sensing locations is different from each of the plurality of self-sensing locations.

10. A method for operating an electronic device comprising:
    having a rollable display configured to be rolled into or unrolled out of a housing, an unrolled portion of the rollable display at an unrolled position extending away from the housing in a first direction, the housing comprising a conductive material configured to be capacitively sensed by a capacitive touch screen on the rollable display; and
    determining that the rollable display is detecting the conductive material at a location on the capacitive touch screen using a multi-mutual sensing process; and determining the unrolled position of the rollable display along the first direction based on the location on the capacitive touch screen.

11. The method of claim 10, wherein the capacitive touch screen comprises a first plurality of capacitive electrodes arranged in rows across the capacitive touch screen and a second plurality of capacitive electrodes arranged in columns across the capacitive touch screen; and wherein determining that the rollable display is detecting the conductive material comprises
- driving each of the rows comprising the first plurality of capacitive electrodes simultaneously; and
- scanning each of the columns comprising the second plurality of capacitive electrodes and measuring the change in capacitance at each intersection between each of the columns comprising the second plurality of capacitive electrodes and each of the rows comprising the first plurality of capacitive electrodes to obtain multi-mutual sensing values; and
- determining the location on the capacitive touch screen based on the multi-mutual sensing values.

12. The method of claim 10, wherein determining that the rollable display is detecting the conductive material comprises
- based on a plurality of self-sensing touch values sensed on the capacitive touch screen, determining that the capacitive touch screen is not detecting contact at the location; and
- based on a plurality of multi-mutual sensing values sensed on the capacitive touch screen, determining that the capacitive touch screen is not detecting contact at the location.

13. The method of claim 10, wherein determining that the rollable display is detecting the conductive material at a location comprises determining an exact location on the capacitive touch screen that is detecting the conductive material using a centroid method.

14. An electronic device comprising:
- a first housing;
- a first retainment structure disposed within the first housing;
- a conductive material disposed within the first retainment structure;
- a touch sensitive display having a first side mounted within the first retainment structure, wherein the touch sensitive display is configured to be rolled into or unrolled out of the first retainment structure to an unrolled position along a first direction, and wherein the touch sensitive display comprises a first plurality of capacitive electrodes arranged in rows across the touch sensitive display and a second plurality of capacitive electrodes arranged in columns across the touch sensitive display;
- a processor;
- a memory for storing a program to be executed in the processor, the program comprising instructions when executed cause the processor to:
  - determine that the touch sensitive display is detecting contact at a plurality of mutual sensing locations;
  - determine that the touch sensitive display is detecting contact at a plurality of self-sensing locations;
  - determine that the touch sensitive display is detecting a plurality of multi-mutual sensing locations; and
  - determine the unrolled position of the touch sensitive display based on the plurality of mutual sensing locations, the plurality of self-sensing locations, and the plurality of multi-mutual sensing locations.

15. The device of claim 14, wherein the conductive material is disposed within the first retainment structure in a manner such that there is a distance between the touch sensitive display and the conductive material within the first retainment structure.

16. The device of claim 14, wherein instructions for determining that the touch sensitive display is detecting a plurality of multi-mutual sensing locations further comprise instructions that cause the processor to:
- drive each of the rows comprising the first plurality of capacitive electrodes simultaneously; and
- scan each of the columns comprising the second plurality of capacitive electrodes and measuring the change in capacitance at each intersection between each of the columns comprising the second plurality of capacitive electrodes and each of the rows comprising the first plurality of capacitive electrodes to obtain multi-mutual sensing values; and
- determine the plurality of multi-mutual sensing locations based on the multi-mutual sensing values.

17. The device of claim 14, wherein instructions for determining that the touch sensitive display is detecting the plurality of mutual sensing locations further comprise instructions that cause the processor to:
- drive each of the rows comprising the first plurality of capacitive electrodes sequentially;
- scan each of the columns comprising the second plurality of capacitive electrodes and measuring the change in capacitance at each intersection between each of the columns comprising the second plurality of capacitive electrodes and each respective driven row of the first plurality of capacitive electrodes to obtain mutual sensing touch values; and
- determine the plurality of mutual sensing locations based on the mutual sensing touch values.

18. The device of claim 14, wherein instructions for determining that the touch sensitive display is detecting contact at the plurality of self-sensing locations further comprise instructions that cause the processor to:
- drive and scan each of the columns comprising the second plurality of capacitive electrodes;
- measure the capacitance of each of the columns comprising the second plurality of capacitive electrodes with respect to ground to obtain self-sensing touch values; and
- determine the self-sensing location based on the self-sensing touch values.

19. The device of claim 14, wherein instructions for determining that the touch sensitive display is detecting contact at the plurality of self-sensing locations further comprise instructions that cause the processor to:
- drive and scan each of the rows comprising the first plurality of capacitive electrodes and each of the columns comprising the second plurality of capacitive electrodes;
- measure the capacitance of each of the rows comprising the first plurality of capacitive electrodes and each of the columns comprising the second plurality of capacitive electrodes with respect to ground to obtain self-sensing touch values; and
- determine the plurality of self-sensing locations based on the self-sensing touch values.

20. The device of claim 14, wherein the program comprises further instructions that when executed cause the processor to:
- determine that the touch sensitive display is detecting the conductive material at a first multi-mutual sensing location of the plurality of multi-mutual sensing locations based on a determination that the first multi-mutual sensing location is not located in any of the same locations as any of the plurality of mutual sensing locations and the plurality of self-sensing locations;

determine an exact location on the touch sensitive display that is detecting the conductive material using a centroid method; and determine the unrolled position of the touch sensitive display along the first direction based on a difference between a fully unrolled length of the touch sensitive display and the exact location on the touch sensitive display that is detecting the conductive material.

21. The device of claim 14, wherein a second side of the touch sensitive display is mounted with a second retainment structure disposed within a second housing.

22. The device of claim 21, wherein the conductive material is disposed within the second retainment structure.

\* \* \* \* \*